US010587639B2

(12) United States Patent
Danielson et al.

(10) Patent No.: US 10,587,639 B2
(45) Date of Patent: Mar. 10, 2020

(54) ASSESSING TRUST OF COMPONENTS IN SYSTEMS

(71) Applicants: Debra J. Danielson, Skillman, NJ (US); Steven L. Greenspan, Scotch Plains, NJ (US); James D. Reno, Scotts Valley, CA (US); Prashant Parikh, Holtsville, NY (US)

(72) Inventors: Debra J. Danielson, Skillman, NJ (US); Steven L. Greenspan, Scotch Plains, NJ (US); James D. Reno, Scotts Valley, CA (US); Prashant Parikh, Holtsville, NY (US)

(73) Assignee: CA, Inc., New York, NY (US)

( * ) Notice: Subject to any disclaimer, the term of this patent is extended or adjusted under 35 U.S.C. 154(b) by 492 days.

(21) Appl. No.: 14/642,882

(22) Filed: Mar. 10, 2015

(65) Prior Publication Data

US 2016/0269436 A1 Sep. 15, 2016

(51) Int. Cl.
*H04L 29/06* (2006.01)
*H04L 29/08* (2006.01)

(52) U.S. Cl.
CPC .......... *H04L 63/1433* (2013.01); *H04L 67/12* (2013.01)

(58) Field of Classification Search
CPC ............. G06F 11/0709; G06F 11/3006; G06F 11/3003; G06F 21/50; G06F 21/57; G06F 17/18; H04L 29/08747; H04L 29/08765; H04L 41/14; H04L 41/145; H04L 41/5038; H04L 63/1433; H04L 67/12
See application file for complete search history.

(56) References Cited

U.S. PATENT DOCUMENTS

| | | | | |
|---|---|---|---|---|
| 8,306,931 B1 * | 11/2012 | Bowman | ............... | G06N 3/0454 706/20 |
| 8,880,275 B1 * | 11/2014 | Del Savio | ............ | G05D 1/0022 114/312 |
| 8,903,593 B1 * | 12/2014 | Addepalli | ............. | H04W 4/046 701/29.1 |

(Continued)

OTHER PUBLICATIONS

Jereb, Network Reliability: Models, Measures and Analysis, 2012.*

(Continued)

*Primary Examiner* — Huan V Doan
(74) *Attorney, Agent, or Firm* — Baker Botts L.L.P.

(57) ABSTRACT

Systems and methods may include receiving performance data of components in a system. The performance data may include data for parameters for each of the components. The systems and methods may include determining aggregate data for each group of similar components of the components. The aggregate data for each group of similar components may include a group characteristic for each of the parameters. The systems and methods may include, for each group of similar components, determining whether the data for each of the parameters for each component is consistent with the group characteristic for the respective parameter. The systems and methods may include, for each component of the respective group determining that the component is anomalous in response to determining that the data for a parameter for the component is not consistent with the group characteristic for the parameter.

17 Claims, 4 Drawing Sheets

(56) References Cited

U.S. PATENT DOCUMENTS

| | | | | |
|---|---|---|---|---|
| 2003/0126256 | A1* | 7/2003 | Cruickshank, III | H04L 41/0213 709/224 |
| 2004/0172227 | A1* | 9/2004 | Aragones | G05B 17/02 703/8 |
| 2005/0073402 | A1* | 4/2005 | Denyer | H04L 43/0817 340/500 |
| 2006/0217935 | A1* | 9/2006 | Beiermeister | G06F 11/0739 702/188 |
| 2007/0150254 | A1* | 6/2007 | Choi | G06F 17/5009 703/22 |
| 2008/0065290 | A1* | 3/2008 | Breed | G01L 17/00 701/31.4 |
| 2009/0021203 | A1* | 1/2009 | Claeys | B60K 6/52 318/452 |
| 2009/0055339 | A1* | 2/2009 | Bernard | G05B 23/0283 706/46 |
| 2009/0216398 | A1* | 8/2009 | Lynch | G01M 7/025 701/29.5 |
| 2010/0228423 | A1* | 9/2010 | Howell | G05B 19/0428 701/31.4 |
| 2011/0060569 | A1* | 3/2011 | Lynn | G06F 11/0739 703/6 |
| 2011/0245999 | A1* | 10/2011 | Kordonowy | G07C 5/0816 701/3 |
| 2012/0282968 | A1* | 11/2012 | Toskala | H04W 24/10 455/517 |
| 2015/0239365 | A1* | 8/2015 | Hyde | B60L 11/1861 701/2 |
| 2015/0323930 | A1* | 11/2015 | Downey | G08G 5/006 701/2 |
| 2016/0093119 | A1* | 3/2016 | Ahn | G07C 5/006 701/29.3 |

OTHER PUBLICATIONS

Chu et al, Detecting Aircraft Performance Anomalies from Cruise Flight Data, Aug. 2010, AIAA, 15 pages.*

Rabatel et al., Anomaly Detection in Monitoring Sensor Data for Preventive Maintenance, HAL-Lirmm, 14 pages (Year: 2012).*

Scrapper et al., Autonomous Road Driving Arenas for Performance Evaluation, 8 pages (Year: 2005).*

* cited by examiner

ASSESSING TRUST OF COMPONENTS IN SYSTEMS

BACKGROUND

The present disclosure relates to infrastructure management and, more specifically, to systems and methods for assessing trust of components in systems.

As the so-called Internet of Things expands, an increasing number of smart devices have been developed to interconnect within the existing Internet infrastructure or other networks. Such devices may be used to collect information and to automate a growing number of important tasks in a variety of fields.

BRIEF SUMMARY

According to an aspect of the present disclosure, a method may include several processes. In particular, the method may include receiving performance data of components in a system. The performance data may include data for parameters for each of the components. In addition, the method may include determining aggregate data for each group of similar components of the components. The aggregate data for each group of similar components may include a group characteristic for each of the parameters. The method also may include, for each group of similar components, determining whether the data for each of the parameters for each component is consistent with the group characteristic for the respective parameter. Further, the method may include, for each component of the respective group determining that the component is anomalous in response to determining that the data for a parameter for the component is not consistent with the group characteristic for the parameter.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to infrastructure management and, more specifically, to assessing trust of components in systems, as related to managing and deploying resources in an IoT infrastructure, systems and methods disclosed herein may be related to other areas beyond the IoT and may be related to aspects of IoT other than the example implementations described herein. Systems and methods disclosed herein may be applicable to a broad range of applications that require access to networked resources and infrastructure and that are associated with various disciplines, such as, for example, research activities (e.g., research and design, development, collaboration), commercial activities (e.g., sales, advertising, financial evaluation and modeling, inventory control, asset logistics and scheduling), IT systems (e.g., computing systems, cloud computing, network access, security, service provisioning), and other activities of importance to a user or organization.

As described below in more detail, aspects of this disclosure may be described with respect to particular example implementations. For example, this disclosure often refers to the example of one or more convoys of trucks operating in one or more geographic locations for one or more organizations. Nevertheless, such example implementations are not limiting examples, but rather are provided for the purposes of explanation. Accordingly, the concepts set forth in this disclosure may be applied readily to a variety of fields and industries and should not be limited to merely the example implementations described herein.

The recent explosion of network-enabled components has presented the opportunity to monitor and study systems over a range of levels. In particular, numerous connected sensors and components are now available and may be incorporated into a variety of systems to enable the real-time monitoring of the system as a whole and the system's components on a discrete level. Such connectivity, however, also opens the door for malicious actors to improperly obtain data from these network-enabled sensors and components or even to hijack such sensors and components for their own malicious purposes.

Certain implementations disclosed herein may permit administrators, users, and other network participants to establish security measures and other trust-based requirements based on the behavior of components deployed in a system. In such implementations, trust may be determined based on a combination of historical component behavior and monitoring the real-time behavior of such components. A component's level of trust may be used to determine whether the component may perform certain tasks or have certain access privileges within a network or other information-processing system. In certain implementations, the component's level of trust may be used to determine whether information received from the component is reliable, whether such information should be made available to other devices or repressed, or even whether the component can be relied upon to perform its intended function.

In particular implementations, systems and methods disclosed herein may use telemetry data received from a plurality of devices to establish a baseline pattern of behavior for the plurality of devices or for related devices among the plurality of devices. Such baseline patterns of behavior may include acceptable ranges for certain performance or environmental characteristics, such as CPU utilization, memory utilization, pressure, geographical location, temperature, or a range of other factors. For example, if the component is a tire on a delivery vehicle, a range of tire pressure, a range of camber angles, a rotational speed, and an ambient temperature may be determined as baseline characteristics for such a tire. The baseline may be established based on data regarding a plurality of tires used by a plurality of delivery vehicles operated by a plurality of delivery companies.

In certain implementations, the baseline may be a model representation of a component in a similar environment (e.g., that uses real-time environmental data as an input). The model may be based on historical information from similar or related components and real-time data from such components. A component's level of trust may be determined based on the component's behavior and whether such behavior deviates from the model. For example, a statistical significance test may be used to determine whether a component is not trustworthy. In particular, if the components behavior deviates from the model by a statistically significant amount (e.g., based on some predetermined level of significance), it may be determined that such component is not trustworthy (e.g., anomalous, broken, hijacked, hacked, infected, malfunctioning). In another example, ranges of acceptable behavior may be established. For example, if a component's position is determined to be outside of an area determined by the model, the component may not be trustworthy (e.g., a delivery driver has taken the vehicle off of the vehicle's route, perhaps to add, remove, or alter some element of the vehicle or to add, remove, or alter unauthorized cargo being used, such that the vehicle is no longer being used for its company/owner-sanctioned purpose of delivering goods). In still other examples, levels of trust may be established based on the amount of deviation from the baseline predicted by the model. Alarms, alerts, or other notifications may be provided based on determining that a device has a low level of trust, for example.

Figure 1:
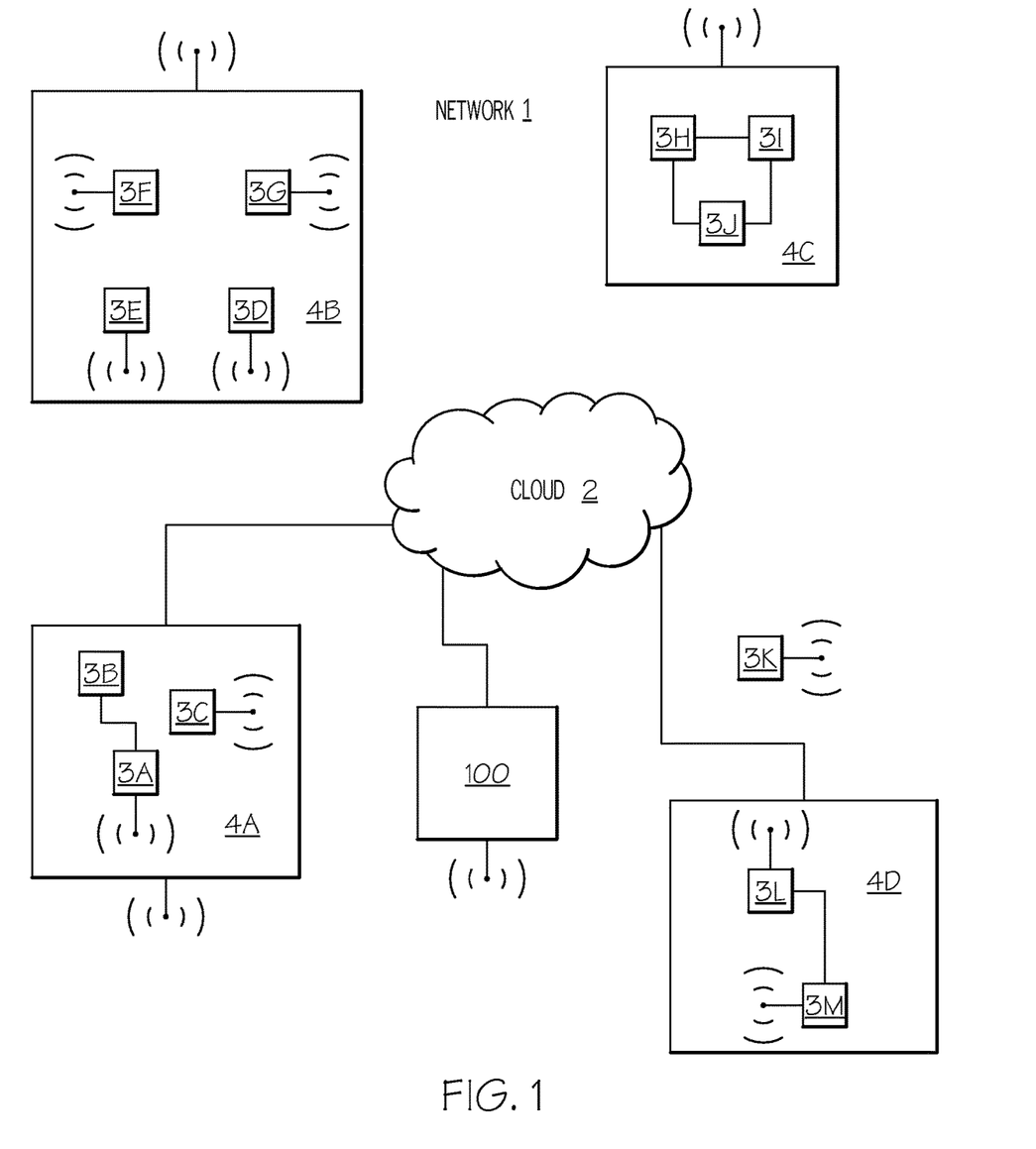
FIG. 1 is a schematic representation of a network 1 on which systems and methods for assessing trust of components in systems may be implemented.

Referring now to FIG. 1, a network 1 comprising a plurality of components now is disclosed. Systems and methods for assessing trust of components in systems may be implemented on network 1. Network 1 may comprise one or more clouds 2, which may be public clouds, private clouds, or community clouds. Each cloud 2 may permit the exchange of information, services, and other resources between various components that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications between components and may permit components to access various resources of network 1.

Network 1 may comprise one or more servers that may store resources thereon, host resources thereon, or otherwise make resources available. Such resources may comprise, but are not limited to, information technology services, financial services, business services, access services, other resource-provisioning services, secured files and information, unsecured files and information, accounts, and other resources desired by one or more entities. More generally, such servers may comprise, for example, one or more of general purpose computing devices, specialized computing devices, mainframe devices, wired devices, wireless devices, and other devices configured to provide, store, utilize, monitor, or accumulate resources and the like.

Network 1 may comprise one or more devices utilized by one or more consumers of provided services. The one or more service providers may provide services to the one or more consumers utilizing the one or more servers, which connect to the one or more devices via network 1. The services may comprise, for example, information technology services, financial services, business services, access services, and other resource-provisioning services. The devices may comprise, for example, one or more of general purpose computing devices, specialized computing devices, mobile devices, wired devices, wireless devices, passive devices, routers, switches, and other devices utilized by consumers of provided services.

Network 1 may comprise a plurality of systems, such as systems 4A-D. Each of the systems may comprise a plurality of components, such as devices 3A-M. Systems 4A-D may be one or more of a plurality of commercial, industrial, or consumer devices, such as cars, trucks, machinery, boats, recreational vehicles, equipment, servers, switches, refrigerators, heating systems, cooling systems, cooking instruments, timers, lighting systems, airplanes, buildings, payment terminals, computers, phones, tablets, shoes, safes, security systems, cameras, or any other conceivable device, for example. For example, system 4B may be a truck, device 3D may be a location sensor (e.g., a global-positioning satellite ("GPS") element) for the truck, device 3E may be a diagnostic sensor for the truck, device 3F may be a temperature sensor for the truck, and device 3G may be a brainwave sensor for the driver of the truck.

Devices 3A-M may be one or more of a variety of devices, such as servers, consumer devices, lights, speakers, brakes, processors, instrumentation, servos, motors, cooling systems, heating systems, pumps, emissions systems, power systems, sensors (e.g., pressure sensors, temperature sensors, airflow sensors, velocity sensors, acceleration sensors, composition sensors, electrical sensors, position sensors), and combinations thereof, for example. More generally, devices 3A-M may be part of one or more systems deployed in the field or in a laboratory environment. Each of devices 3A-M may include an input/output ("I/O") device, such that each of devices 3A-M may transmit and receive information over network 1 to processing systems 100, others of devices 3A-M, and other systems or devices. Such transmitted information may include performance data (e.g., telemetry data) related to the device (e.g., position of the device, temperature near the device, air pressure near the device, environmental composition near the device, information indicating whether the device is functioning, log information identifying sources and/or recipients of information received and/or sent by the device and/or the nature of such information, information about components being monitored by the device, status information, other parameters), requests for information from other devices, and commands for other devices to perform particular functions, for example. Devices 3A-M may receive similar information from other devices. In some configurations, one or more of devices 3A-M may aggregate and process the received information and generate new information therefrom, such as summary information, forecast information, and other useful information for transmission to other devices, for example. In some configurations, components, such as device 3K, may operate independently and effectively function as a single-component system, for example.

Moreover, network 1 may comprise one or more processing system 100 that may collect and process data received from one or more components or systems within network 1, as will be described in more detail below. In some configurations, processing system 100 may be a server, a consumer device, a combination of a server and a consumer device, or any other device with the ability to collect and process data. Processing system 100 may include a single processor or a plurality of processors. In some configurations, processing system 100 may be implemented by an integrated device. In other configurations, processing system 100 may be implemented by a plurality of distributed systems residing in one or more geographic regions.

Figure 2:
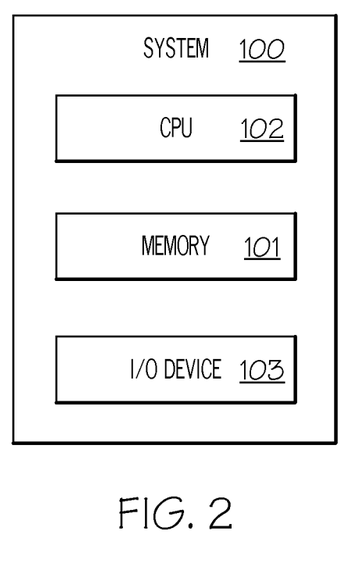
FIG. 2 is a schematic representation of a system configured to assess trust of components in systems.

Referring now to FIG. 2, processing system 100, which may be configured to assess trust of components in systems, now is described. System 100 may comprise a memory 101, a CPU 102, and an input and output ("I/O") device 103. Memory 101 may store computer-readable instructions that may instruct system 100 to perform certain processes. I/O device 103 may transmit data to/from cloud 2 and may transmit data to/from other devices connected to system 100. Further, I/O device 103 may implement one or more of wireless and wired communication between system 100 and other devices.

Figure 3:
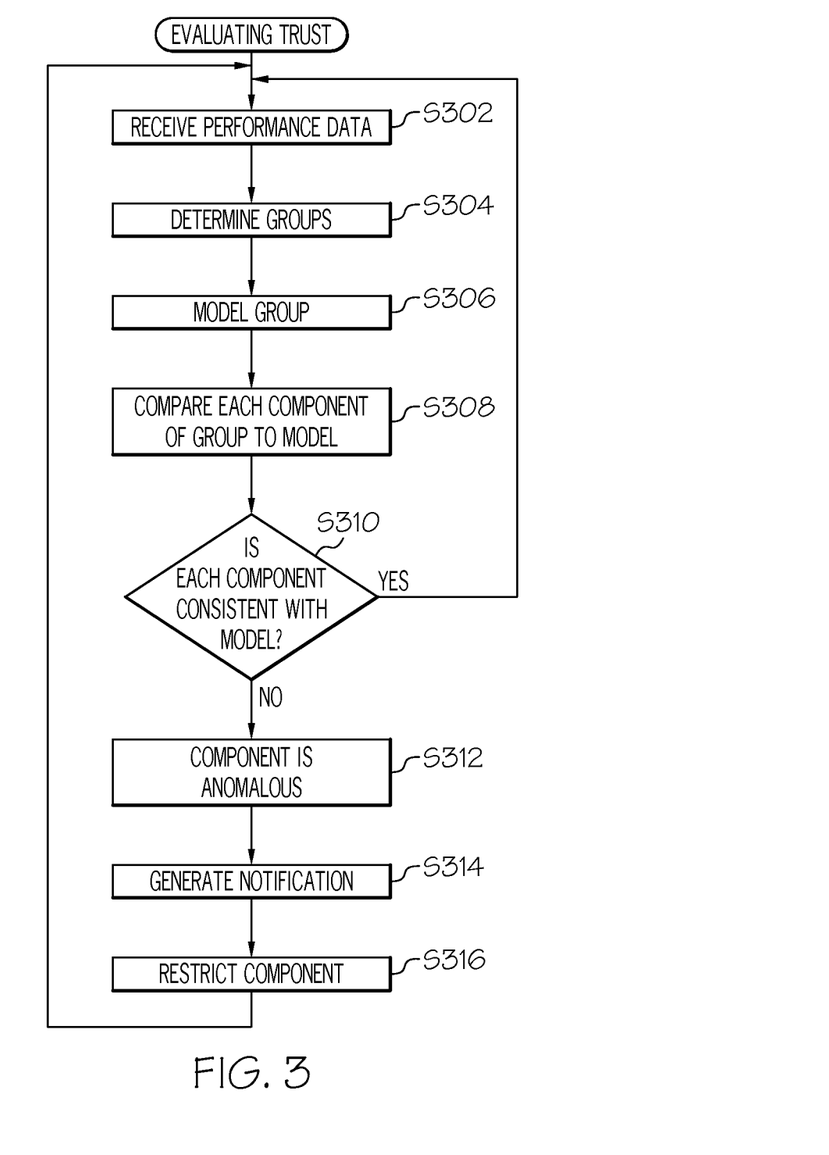
FIG. 3 illustrates a process of evaluating trust.

Referring now to FIG. 3, a process of evaluating trust now is described. In the process of evaluating trust shown in FIG. 3, processing system 100 may use performance data received from a plurality of devices in a system, such as network 1 or one or more of systems 4A-D, to assess the level of trust of one or more components within the system, such as one or more of components 3A-M. In certain implementations, processing system 100 may establish groups for the monitored components. Processing system 100 may then use a combination of real-time and historical information to model the behavior of one or more representative components for each group. Further, processing system 100 may compare the modeled behavior of a representative component for each group with the actual behavior of each component in the group to determine whether the behavior of each component is consistent with the model. System 100 may use the results of such comparison to determine whether one or more component is acting anomalously and, consequently, has a reduced level of trust. In response to determining that the one or more component is acting anomalously, system 100 may provide notifications informing users, administrators, and/or related components about the anomalous behavior. In certain implementations, system 100 may restrict the one or more component's access to other components or the network, for example, or may isolate, ignore, replace, or disregard the one or more components, related components, or data provided therefrom. Consequently, this method may assist in identifying anomalous behavior and reducing deleterious effects that may be caused thereby.

In S302, system 100 may receive performance data (e.g., telemetry data) from components in network 1. For example, systems 4A-D may each represent a delivery truck owned by a delivery company. Components 3A,D,H,L may each be a temperature sensor for the respective one of systems 4A-D, and components 3B,E,I,M may each be a GPS sensor for the respective one of systems 4A-D. Components 3C,F,J may each be a speed sensor for the respective one of systems 4A-C, and component 3G may be a controller for system 4B. Consequently, components 3A,D,H,L may provide local temperature data for each of systems 4A-D to others of systems 4A-D and/or to system 100, components 3B,E,I,M may provide position data for each of systems 4A-D to others of systems 4A-D and/or to system 100, components 3C,F,J may provide speed data for each of systems 4A-C to others of systems 4A-D and/or to system 100, and component 3G may provide commands or other information to one or more of systems 4A-D and/or to system 100.

In S304, system 100 may determine groups for components in network 1. For example, in certain implementations, system 100 may group components by function, type, or type of data produced (e.g., temperature sensors, GPS sensors, speed sensors, pressure sensors, radios, transmitters, receivers, terminals, servers, computers, workstations, controllers, routers, switches, access points). In other implementations, system 100 may group components based on group assignments provided by an administrator or other authority. In still other implementations, system 100 may group components based on related functions of such components (e.g., the components are different but part of the same system, the components interact with or are co-dependent on one another). In some implementations, system 100 may group components based on performance data for such components or for related components. For example, system 100 may group components with similar GPS positions (e.g., the components are located within a particular distance of each other, the components periodically move together or at the same time, the components periodically move along the same path at the same time or at different times) or components that are related to components with similar GPS positions (e.g., components with similar functions that are part of systems with similar GPS positions). Some components may be part of a plurality of groups, and certain groups may be subsets of other groups, for example. In certain implementations, system 100 may group components by owner or user.

As a more particular example, systems 4A,B may represent delivery trucks that often travel in a caravan together along a route from Louisiana to Alaska. System 4C may represent a delivery truck that often travels along the same route from Louisiana to Alaska, but at different times than systems 4A,B. System 100 may determine that components 3A,D,H (e.g., GPS sensors) are in a first group (e.g., a group based on travel route) together because such components follow similar paths. In some implementations, system 100 may actually determine that all of the components associated with systems 4A-C are in the first group together because such components all follow similar paths. System 100 may further determine that components 3C,F,J (e.g., speed sensors) are in a second group (e.g., a group based on travel route and function) together because such components are each part of a system that follows the same path and have similar functions. Further, system 100 may determine that components 3A,D are in a third group (e.g., a group based on a caravan) together because such components follow similar paths at the same time. In some implementations, system 100 may actually determine that all of the components associated with systems 4A,B are in the third group together because such components all follow similar paths at the same time. Consequently, system 100 may further determine that components 3B,E (e.g., temperature sensors) are in a fourth group (e.g., a group based on caravan and function) together because such components follow similar paths at the same time and have similar functions.

In S306, system 100 may generate a model representation of each group. This model may be developed and refined iteratively as data is acquired over time and as the model is compared with the actual behavior of the group and/or components within the group. In certain implementations, the model representation of each group may be part of a model representation of network 1 or some other multi-component system. More particularly, system 100 may aggregate performance data received from components in network 1 in real-time with historical performance data for such components and other similar components and use such performance data to generate a virtual model of components within network 1 and other environments. The performance data may include data for a plurality of parameters corresponding to data received from each of the components (e.g., position data, temperature data, pressure data, status data, usage data, speed data). Processing system 110 may store such received data in memory 112 to aggregate historical performance data for the components. Performance data for each component may include, for example, a location of the component, an identity that controls the component, an identifier for another component that the component has involved in an interaction with the component, a type of the interaction with the component, a metric regarding the interaction with the component (e.g., duration, intensity, resources utilized, information accessed), a type of environment in which the component operates, a metric regarding the environment in which the component operates (e.g., ambient temperature, humidity, weather conditions, season, altitude, traffic conditions), and/or data representing human intelligence or intuition.

System 100 may use statistical methods to determine a baseline behavior (e.g., a group characteristic) for each parameter associated with group determined in S304. Such statistical methods may include, for example, simulation, machine learning, stream analytics, content analytics, crowdsourcing, data mining, and other methods for processing and analyzing data. For example, system 100 may determine an average speed at each position along the route from Louisiana to Alaska based on the GPS data and speed data received from components 3A,C,D,F,H,J, as well as historical data for similar components, and establish this average speed profile as a baseline behavior for components in the first group (e.g., components 3A,D,H, components of systems 4A-C) and for components in the second group (e.g., components 3C,F,J), for example. In other implementations, a range of speeds may be determined and established as the baseline behavior for components in such groups, for example.

In another example, system 100 may determine an average temperature for components in the third group (e.g., components 3A,D, components of systems 4A,B) and components in the fourth group (e.g., components 3B,E) based on temperature data received from components 3B,E, as well as historical data for similar components and other data from the environment, and establish the average temperature as the current baseline temperature for components in such groups. In other implementations, a range of temperatures may be determined and established as the current baseline temperature for components in such groups, for example.

In S308, system 100 may compare the performance data received from each component to the baseline behavior determined for each group in which such component is a member. For example, system 100 may compare the speed of each component 3A-J (e.g., as determined from the speed data received from components 3C,F,J) with the average speed (or range of speeds), which corresponds to the position of each component 3A-J (e.g., as determined from the GPS data provided by components 3A,D,H), determined as a group characteristic (e.g., baseline behavior) for the first and second groups in S306. As another example, system 100 may compare the temperature of each component 3A-G (e.g., as determined from the temperature data received from components 3B,E) with the average temperature (or range of temperatures) determined as a group characteristic for the third and fourth groups in S306.

In S310, system 100 may, for each component in network 1, determine whether the component's behavior and/or data is consistent with the model generated in S306. More specifically, system 100 may, for each component in network 1, determine whether the component's behavior and/or data is consistent with the baseline behavior determined for the component's group(s) in S306 based on a result of the comparison in S308. When the group characteristic is defined as a range of values (e.g., a range of speeds, a range of temperatures), for example, system 100 may determine that the component's behavior and/or data is not consistent with the baseline behavior (S310: No) when the performance data from the component falls outside of the range of values, and system 100 may determine that the component's behavior and/or data is consistent with the baseline behavior (S310: Yes) when the performance data from the component falls within the range of values.

In another example, when the group characteristic is defined as an average value (e.g., an average speed, an average temperature), system 100 may determine whether the component's behavior and/or data is consistent with the group characteristic based on whether the performance data from the component is reasonable in view of the group characteristic. When system 100 determines that the performance data from the component is reasonable in view of the group characteristic, system 100 may determine that the component's behavior and/or data is consistent with the group characteristic (S310: Yes). When system 100 determines that the performance data from the component is not reasonable in view of the group characteristic, system 100 may determine that the component's behavior and/or data is not consistent with the group characteristic (S310: No).

In particular implementations, for example, system 100 may use a statistical significance test to determine whether the performance data from the component is reasonable in view of the group characteristic. More specifically, system 100 may determine whether the difference between the value of a parameter of the performance data from the component and the group characteristic for the parameter in the component's group is statistically significant based on a predetermined level of significance (e.g., 5%, 1%, 0.1%). If the difference is statistically significant, system 100 may determine that the performance data from the component is not reasonable in view of the group characteristic. If the difference is not statistically significant, system 100 may determine that the performance data from the component is reasonable in view of the group characteristic. This process is described in more detail below with respect to FIG. 4 below.

If system 100 determines that a component's behavior and/or data is consistent with the group characteristic (S310: Yes), system 100 may determine that the component is not anomalous, continue determining whether other components are consistent with their respective group characteristics, and return to S302 to wait for further performance data to be received. If system 100 determines that a component's behavior and/or data is not consistent with the group characteristic (S310: No), the process may proceed to S312 and system 100 may determine that the component is anomalous and, consequently, that the component has a low level of trust. The anomalous behavior may be the result of a virus, being hacked, a malfunction, a defect, a broken element, interference, or other problem, for example.

In certain implementations, the range of acceptable behavior may be configurable. For example, an administrator may set the range or level of significance, such that only deviations from the group characteristic exceeding the set range or significance may be determined as anomalous in S312. In some implementations, the range or level of significance may be based on a risk factor for the component. For example, if a component is critical to the operation of a system, the risk factor may be high, and a smaller range or level of significance may be established, such that even small deviations from the group characteristic may indicate that the component is anomalous. Conversely, if a component is not critical to the operation of a system, the risk factor may be low, and a smaller range or level of significance may be established, such that only large deviations from the group characteristic may indicate that the component is anomalous.

Although the example configurations described above may identify anomalous components based on a single parameter (e.g., position, speed, temperature, and/or other parameters) of performance data, anomalous components may be identified based on a plurality of parameters of performance data. For example, components may have different group characteristics for speed based on the position of such components. More specifically, for example, if GPS data for a truck indicates that the truck is on the highway, the group characteristic may indicate an acceptable range of speeds between 40 and 75 miles per hour, but if GPS data for the truck indicates that the truck is on a city street, the group characteristic may indicate an acceptable range of speeds between 5 and 35 miles per hour. In other words, if the truck's speed is greater than 50 and less than 70 miles per hour, then the truck's speed is not a problem unless the GPS data indicates that the truck is on a city street, for example. Consequently, both speed and position data may be required to determine whether one or more components of the truck are anomalous.

In response to determining that a component is anomalous in S312, system 100 may proceed to S314 and generate a notification for other components communicating with the anomalous component, an administrator of network 1, a user of a system including the anomalous component, or another entity or system, for example. The notification may identify the component as anomalous and may recommend actions to reduce the impact of the anomalous event (e.g., disregarding performance data from the component, isolating the component, replacing the component, collecting alternative data from other components). In some implementations, the notification may include a command or instruction to perform such actions. In certain implementations, the notification may be logged for a later audit.

In some implementations, system 100 may generate the notification of S314 only if the difference between a component's behavior and the group characteristic exceeds a certain threshold (e.g., deviates by more or less than 10% of a value associated with the group characteristic), even when system 100 has determined that the component is anomalous in S312. In such implementations, system 100 may initiate additional (e.g., more frequent, based on additional parameters) monitoring of the component when system 100 has determined that the component is anomalous in S312, for example, and only provide the notification in S314 when the difference between the component's behavior and the group characteristic exceeds the threshold.

In response to determining that a component is anomalous in S312, system 100 may proceed to S316 (before, after, or in place of S314) and restrict the anomalous component. For example, system 100 may isolate or deactivate the anomalous component, such that the component cannot transmit or receive data (or can only transmit or receive limited data) to/from other components within network 1. Consequently, deleterious effects from the anomalous component on the corresponding system or within the network may be reduced or avoided completely. After S316, system 100 may continue determining whether other components are consistent with their respective group characteristics, and return to S302 to wait for further performance data to be received.

Figure 4:
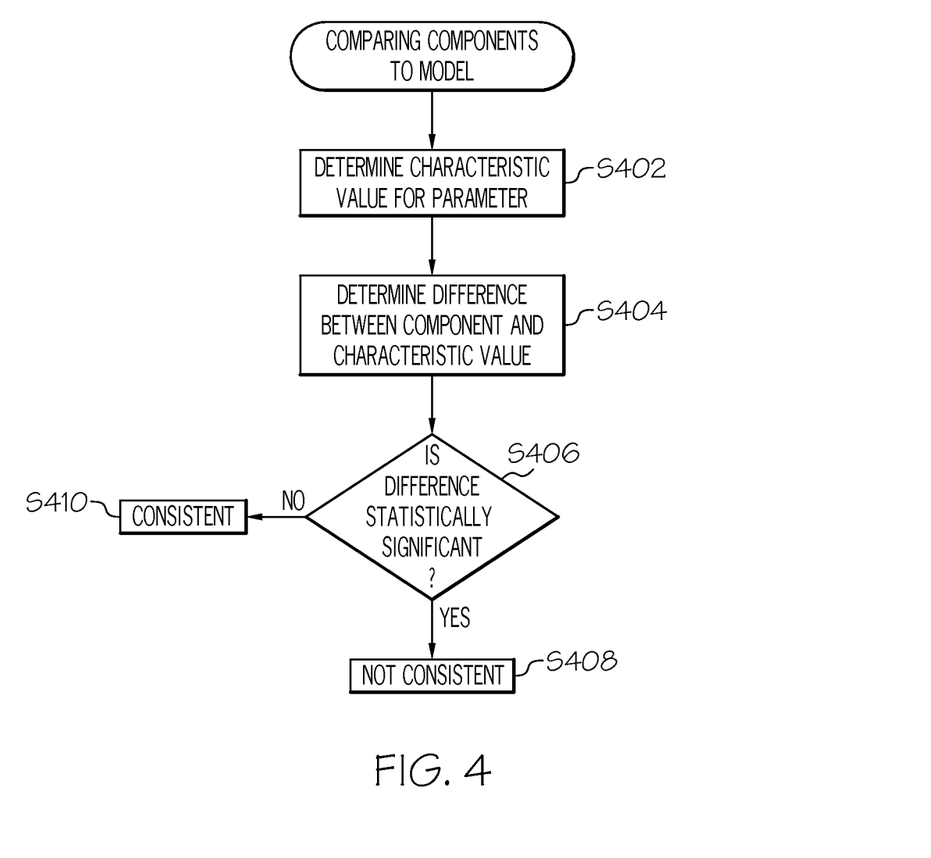
FIG. 4 illustrates a process of comparing components to a model according to some implementations.

Referring now to FIG. 4, a process of comparing components to a model according to some implementations now is described. The process of FIG. 4 may be performed as part of one or more of S306, S308, and S310, and may be used to determine whether a component's behavior and/or data is consistent with the baseline behavior. More specifically, FIG. 4 shows an implementation in which a reasonableness test based on statistical significance is used to determine whether a component's behavior and/or data is consistent with the baseline behavior.

In S402, system 100 may determine a characteristic behavior for each group. The characteristic behavior for a group may include a representative value (e.g., a single value or a range of values) for one or more parameters of performance data for components in the group, such as an average temperature or speed for components in the group at a particular location or point in time, for example. In some implementations, the characteristic value may include representative correlations between a plurality of parameters of performance data. In an example of such configurations, fuel consumption rates for a truck may be considered inconsistent if the fuel consumption does not fall into a range around the result of a calculation based on a plurality of parameters of the performance data including the speed of the truck and the temperature of air outside the truck.

In S404, for each component, system 100 may determine a difference between the value of a parameter of the performance data for the component and the representative value for the parameter in the component's group. This may provide an indication of how much the performance data from the component deviates from the group.

In S406, system 100 may, for each component, determine whether the difference between the value of the parameter of the performance data for the component and the representative value for the parameter in the component's group is statistically significant based on a predetermined level of significance (e.g., 5%, 1%, 0.1%). If the difference is statistically significant (S406: Yes), system 100 may proceed to S408 and determine that the component's performance data indicates that the component's behavior and/or data is not consistent with the baseline behavior for the group. If the difference is not statistically significant (S406: no), system 100 may proceed to S410 and determine that the component's performance data indicates that the component's behavior and/or data is consistent with the baseline behavior for the group.

Although the example configurations described above may determine whether a component's behavior and/or data is not consistent with the baseline behavior for the group based on whether the difference between the value of the parameter of the performance data for the component and the representative value for the parameter in the component's group is statistically significant, such a determination of consistent behavior is not limited to statistical significance and other mechanisms may be used to make such a determination of consistent behavior.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
    receiving performance data of a plurality of components in a system, the performance data comprising data for a plurality of parameters for each component of the plurality of components;
    using the performance data to identify a plurality of groups of similar components;
    determining aggregate data for each group of the plurality of groups of similar components;
    using the aggregate data to generate a respective model for each group of the plurality of groups of similar components, the respective model comprising a group characteristic for each parameter of the plurality of parameters; and for each group of the plurality of groups of similar components:
  determining whether the data for each parameter of the plurality of parameters for each component of a group of similar components is consistent with the group characteristic for a respective parameter by:
    generating a virtual model of the respective parameter based on the performance data of the plurality of components; and
    determining whether a difference between the data for the respective parameter for a respective component and one or more values for the respective parameter is statistically significant based upon a predetermined level of significance;
  in response to determining that the difference between the data for the respective parameter for the respective component and the one or more values for the respective parameter is not statistically significant, determining that the data for the respective parameter for the respective component is reasonable in view of the one or more values for the respective parameter;
  in response to determining that the difference between the data for the respective parameter for the respective component and the one or more values for the respective parameter is statistically significant, determining that the data for the respective parameter for the respective component is not reasonable in view of the one or more values for the respective parameter; and
  for each component of a respective group of similar components, in response to determining that the data for a parameter of the plurality of parameters for a component is not consistent with the group characteristic for the parameter, determining that the component is anomalous; and
  in response to determining that the component is anomalous, isolating the component by allowing it to transmit only limited telemetry data to other components of the respective group.

2. The method of claim 1,
wherein the group characteristic identifies the one or more values for the respective parameter that is common for similar components within the respective group,
wherein determining whether the data for each parameter of the plurality of parameters for each component of the plurality of components is consistent with the group characteristic for the respective parameter comprises:
determining whether the data for the respective parameter for the respective component is reasonable in view of the one or more values for the respective parameter identified by the group characteristic;
in response to determining that the data for the respective parameter for the respective component is not reasonable in view of the one or more values for the respective parameter identified by the group characteristic, determining that the data for the respective parameter for the respective component is not consistent with the group characteristic for the parameter; and
in response to determining that the data for the respective parameter for the respective component is reasonable in view of the one or more values for the respective parameter identified by the group characteristic, determining that the data for the respective parameter for the respective component is consistent with the group characteristic for the parameter.

3. The method of claim 1, wherein each group of the plurality of groups of similar components comprises one or more of: components associated with the same owner; and components with historically matching performance data.

4. The method of claim 1, wherein the plurality of parameters for each component of the plurality of components comprises one or more of: a location of the component; an identity that controls the component; and an identifier for another component that the component has involved in an interaction with the component.

5. The method of claim 1, further comprising: for each component of the plurality of components for each group of the plurality of groups of similar components, in response to determining that the component is anomalous, generating a notice indicating that the component is anomalous.

6. The method of claim 1, further comprising: for each component of the plurality of components for each group of the plurality of groups of similar components, in response to determining that the component is anomalous, restricting access to the system by the component.

7. A system comprising:
a processor;
a memory;
instructions stored in the memory that, when executed by the processor, cause the system to:
  receive performance data of a plurality of components in a system operating in a first environment, the performance data comprising data for a plurality of parameters for each component of the plurality of components;
  using the performance data to allocate the plurality of components into separate groups of similar components; and
  for each group of the groups of similar components:
    determine aggregate data;
    using the aggregate data to generate a respective model for each group of the groups of similar components, the respective model comprising a group characteristic for each parameter of the plurality of parameters;
    determine whether the data for each parameter of the plurality of parameters for each component of a group of similar components is consistent with the group characteristic for a respective parameter by:
      generating a virtual model of the respective parameter based on the performance data of the plurality of components; and
      determining whether a difference between the data for the respective parameter for a respective component and one or more values for the respective parameter is statistically significant based upon a predetermined level of significance;
    in response to determining that the difference between the data for the respective parameter for the respective component and the one or more values for the respective parameter is not statistically significant, determine that the data for the respective parameter for the respective component is reasonable in view of the one or more values for the respective parameter;
    in response to determining that the difference between the data for the respective parameter for the respective component and the one or more values for the respective parameter is statistically significant, determine that the data for the respective parameter for the respective component is not reasonable in view of the one or more values for the respective parameter;

for each component of a respective group of similar components, in response to determining that the data for a parameter of the plurality of parameters for a component is not consistent with the group characteristic for the parameter, determining that the component is anomalous; and in response to determining the component is anomalous, isolating the component by limiting the amount of telemetry data that the component is allowed to transmit to other components of the respective group.

8. The system according to claim 7,
wherein the group characteristic identifies the one or more values for the respective parameter that is common for similar components within the respective group,
wherein, when determining whether the data for each parameter of the plurality of parameters for each component of the plurality of components is consistent with the group characteristic for the respective parameter, the processing system is further configured to:
determine whether the data for the respective parameter for the respective component is reasonable in view of the one or more values for the respective parameter identified by the group characteristic;
in response to determining that the data for the respective parameter for the respective component is not reasonable in view of the one or more values for the respective parameter identified by the group characteristic, determine that the data for the respective parameter for the respective component is not consistent with the group characteristic for the parameter; and
in response to determining that the data for the respective parameter for the respective component is reasonable in view of the one or more values for the respective parameter identified by the group characteristic, determine that the data for the respective parameter for the respective component is consistent with the group characteristic for the parameter.

9. The system according to claim 7, wherein each group of the groups of similar components comprises one or more of: components associated with the same owner; components that perform the same function; components with the same structure; components that are assigned to the same group; and components with historically matching performance data.

10. The system according to claim 7, wherein the plurality of parameters for each component of the plurality of components comprises one or more of: a location of the component; an identity that controls the component; an identifier for another component that the component has involved in an interaction with the component; a type of the interaction with the component; a metric regarding the interaction with the component; a type of environment in which the component operates; and a metric regarding the environment in which the component operates.

11. The system according to claim 7, wherein the processing system is further configured to: for each component of the plurality of components for each group of the groups of similar components, in response to determining that the component is anomalous, generate a notice indicating that the component is anomalous.

12. The system according to claim 7, wherein the processing system is further configured to: for each component of the plurality of components for each group of the groups of similar components, in response to determining that the component is anomalous, restrict access to the system by the component.

13. A computer program product comprising:
a non-transitory computer readable storage medium having computer readable program code embodied therewith, the computer readable program code comprising:
computer readable program code configured to receive performance data of a plurality of components in a system, the performance data comprising data for a plurality of parameters for each component of the plurality of components;
computer readable program code configured to use the performance data to identify a plurality of groups of similar components;
computer readable program code configured to determine aggregate data for each group of similar components of the plurality of components;
computer readable program code configured to, using the aggregate data, generate a respective model for each group of the plurality of groups of similar components, the respective model comprising a group characteristic for each parameter of the plurality of parameters; and
computer readable program code configured to, for each group of the plurality of groups of similar components:
determine whether the data for each parameter of the plurality of parameters for each component of a group of similar components is consistent with the group characteristic for a respective parameter by:
generating a virtual model of the respective parameter based on the performance data of the plurality of components; and
determining whether a difference between the data for the respective parameter for a respective component and one or more values for the respective parameter is statistically significant based upon a predetermined level of significance;
in response to determining that the difference between the data for the respective parameter for the respective component and the one or more values for the respective parameter is not statistically significant, determine that the data for the respective parameter for the respective component is reasonable in view of the one or more values for the respective parameter;
in response to determining that the difference between the data for the respective parameter for the respective component and the one or more values for the respective parameter is statistically significant, determine that the data for the respective parameter for the respective component is not reasonable in view of the one or more values for the respective parameter; and
for each component of a respective group of similar components, in response to determining that the data for a parameter of the plurality of parameters for a component is not consistent with the group characteristic for the parameter, determining that the component is anomalous; and
in response to determining that the component is anomalous, isolating the component by allowing it to transmit only limited telemetry data to other components of the respective group.

14. The computer program product of claim 13,
wherein the group characteristic identifies the one or more values for the respective parameter that is common for similar components within the respective group, wherein the computer readable program code configured to determine whether the data for each parameter of the plurality of parameters for each component of the plurality of components is consistent with the group characteristic for the respective parameter comprises:

computer readable program code configured to determine whether the data for the respective parameter for the respective component is reasonable in view of the one or more values for the respective parameter identified by the group characteristic;

computer readable program code configured to, in response to determining that the data for the respective parameter for the respective component is not reasonable in view of the one or more values for the respective parameter identified by the group characteristic, determine that the data for the respective parameter for the respective component is not consistent with the group characteristic for the parameter; and     computer readable program code configured to, in response to determining that the data for the respective parameter for the respective component is reasonable in view of the one or more values for the respective parameter identified by the group characteristic, determine that the data for the respective parameter for the respective component is consistent with the group characteristic for the parameter.

15. The computer program product of claim 13, wherein each group of the plurality of groups of similar components comprises one or more of: components associated with the same owner; components that perform the same function; components with the same structure; components that are assigned to the same group; and components with historically matching performance data.

16. The computer program product of claim 13, wherein the plurality of parameters for each component of the plurality of components comprises one or more of: a location of the component; an identity that controls the component; an identifier for another component that the component has involved in an interaction with the component; a type of the interaction with the component; a metric regarding the interaction with the component; a type of environment in which the component operates; and a metric regarding the environment in which the component operates.

17. The computer program product of claim 13, further comprising: computer readable program code configured to, for each component of the plurality of components for each group of the plurality of groups of similar components, in response to determining that the component is anomalous, restricting access to the system by the component.

* * * * *